(No Model.)
W. F. HUTCHINSON.
SHAFT CASING.
No. 322,540. Patented July 21, 1885.
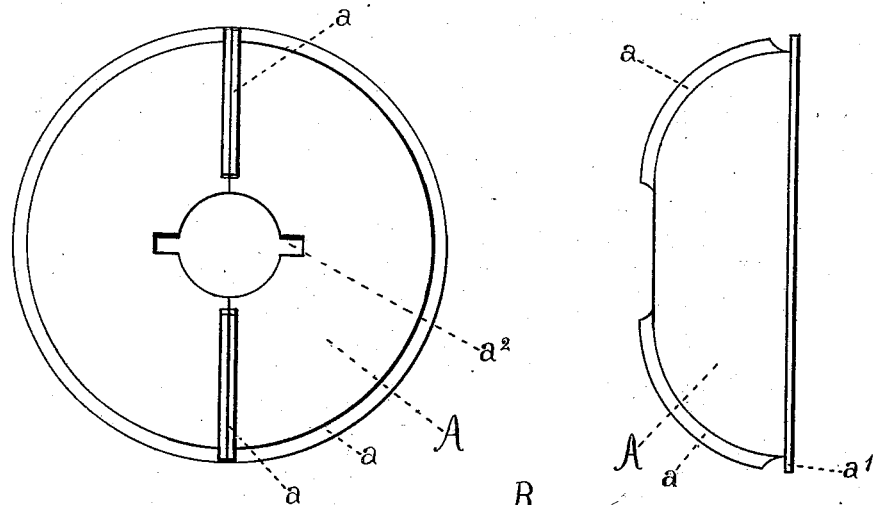
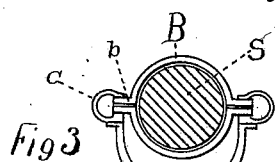
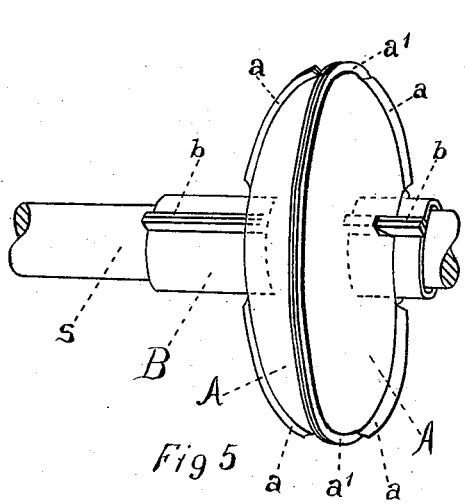
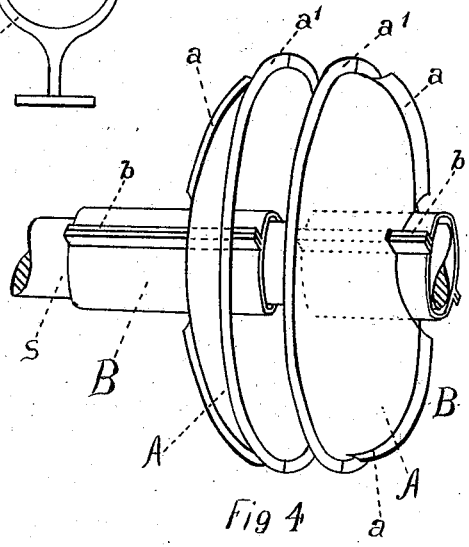
Witnesses.
W. A. Bancroft
Daniel Hutchinson
William F. Hutchinson
Inventor.
by
Hutchinson Bros.
Attorneys

UNITED STATES PATENT OFFICE.

WILLIAM F. HUTCHINSON, OF LYNN, MASSACHUSETTS.

SHAFT-CASING.

SPECIFICATION forming part of Letters Patent No. 322,540, dated July 21, 1885.

Application filed January 3, 1885. (No model.)

*To all whom it may concern:*

Be it known that I, WILLIAM F. HUTCHINSON, of Lynn, county of Essex, and Commonwealth of Massachusetts, have invented certain new and useful Improvements in Safety Attachments for Shafting and Pulleys, of which the following is a specification.

My invention is designed as an improvement on the device covered by Letters Patent No. 276,589, and issued to me May 1, 1883; and the object of my invention is to provide a covering for running shafting used in shops and factories, so as to prevent the clothing of employés and others from becoming entangled in the shafting, thereby causing painful and serious accidents, and also to prevent the shafting from throwing dirt and oil. I attain these objects by means of the mechanism illustrated in the accompanying drawings, in which—

Figure 1 is an end view of one of the disks for covering the pulley; Fig. 2, a side view of the same; Fig. 3, an end view of the shaft-casing and hanger for supporting the shaft-casing; Fig. 4, a perspective view of the shaft, shaft-casing, and disks for covering the pulley, with the disks open or slipped back upon the shaft-casing, and Fig. 5 a view of the same with the disks closed or slipped together.

The disks or pulley-casing A and shaft-casing B can be made of papier-maché, leather-board, pasteboard, or any material that can be molded to the required shape. The disks A are made in four pieces, with flanges $a$ at an angle with the shaft, flanges $a'$ around the circumference and slots $a^2$, so that the flanges $b$ upon the shaft-casing B will fit into the slots $a^2$ and thus prevent the disk A from turning, and at the same time allow it to be slipped back upon the shaft-casing B. The shaft-casing B is made in two half-sections with flanges $b$. The sections are fastened together around the shaft S by means of the snap-spring $c$, as shown in Fig. 3, or by a pin or other suitable fastening.

In adjusting my invention the shaft-casing B should be first fastened around the shaft S, as described, and held in place by the hanger C or other suitable support. The disks A should then be placed upon the shaft-casing B, so that the flanges $b$ on the shaft-casing will fit into the slots $a^2$ in the disks and the flanges $a\,a$ on the disks A will come together, as shown in Fig. 1. The disks A should then be slipped together over the pulley, so that the flanges $a'\,a'$ will come together, as shown in Fig. 5.

The flanges $a\,a$ and $a'\,a'$ upon the disks A may be fastened together by a pin, snap, or any suitable means. Holes may be cut in the disks A to correspond with the belt upon the pulley and through which the belt may pass.

From the foregoing description it will be seen that my shaft-casing and disks can be easily adjusted to the shaft and pulleys while they are in motion and furnish a cheap and efficient covering for the same.

Having fully described my invention, what I claim as new, and desire to secure by Letters Patent, is—

1. A rigid shaft-casing composed of two half-sections and adapted to be fastened around a running shaft, substantially as described.

2. The shaft-casing B, having flanges $b$, substantially as shown, and for the purpose described.

3. In a casing for shafting, the disk A, having flanges $a\,a'$ and slots $a^2$, substantially as shown, and for the purpose specified.

4. In a casing for shafting, the combination of the disk A, having flanges $a\,a'$ and slots $a^2$, with the shaft-casing B and flanges $b$, substantially as described.

5. The general arragement of the casing B, flanges $b$, and disks A, adapted to be slipped upon the casing B, all substantially as described, and for the purpose set forth.

In testimony whereof I have signed my name to this specification in presence of two witnesses.

WILLIAM F. HUTCHINSON.

Witnesses:
WARREN B. HUTCHINSON,
CHAS. ALLEN TABER.